(12) United States Patent
Uchino et al.

(10) Patent No.: US 10,880,054 B2
(45) Date of Patent: *Dec. 29, 2020

(54) MOBILE STATION

(71) Applicant: NTT DOCOMO, INC., Tokyo (JP)

(72) Inventors: Tooru Uchino, Tokyo (JP); Hideaki Takahashi, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/033,126

(22) PCT Filed: Oct. 27, 2014

(86) PCT No.: PCT/JP2014/078441
§ 371 (c)(1),
(2) Date: Apr. 29, 2016

(87) PCT Pub. No.: WO2015/064516
PCT Pub. Date: May 7, 2015

(65) Prior Publication Data
US 2016/0254887 A1  Sep. 1, 2016

(30) Foreign Application Priority Data
Oct. 31, 2013 (JP) ................. 2013-226949

(51) Int. Cl.
*H04L 5/00* (2006.01)
*H04W 74/08* (2009.01)
(Continued)

(52) U.S. Cl.
CPC ....... *H04L 5/0032* (2013.01); *H04W 72/0426* (2013.01); *H04W 74/008* (2013.01);
(Continued)

(58) Field of Classification Search
CPC ............ H04L 5/0032; H04W 72/0426; H04W 74/008; H04W 74/0833; H04W 76/025; H04W 76/046
(Continued)

(56) References Cited

U.S. PATENT DOCUMENTS 9,622,126 B2 * 4/2017 Uchino ................ H04W 72/04
2012/0257513 A1* 10/2012 Yamada ................ H04L 1/0618
370/248
(Continued)

FOREIGN PATENT DOCUMENTS

EP       2648471 A1    10/2013
JP     2013-005367 A    1/2013
(Continued)

OTHER PUBLICATIONS

International Search Report issued in PCT/JP2014/078441 dated Jan. 20, 2015 (2 pages).
(Continued)

*Primary Examiner* — Chi Tang P Cheng
(74) *Attorney, Agent, or Firm* — Osha Bergman Watanabe & Burton LLP

(57) ABSTRACT

To perform "Inter-eNB CA" without complicating the implementation of a radio base station MeNB. A mobile station UE of the present invention includes a controlling unit 13 configured to, when in "RRC_Connected state" in Pcell that is under the control of the radio base station MeNB, and when Scell that is under the control of a radio base station SeNB has been set, autonomously activate the Scell.

1 Claim, 4 Drawing Sheets

(51) Int. Cl.
  *H04W 76/15* (2018.01)
  *H04W 72/04* (2009.01)
  *H04W 74/00* (2009.01)
  *H04W 76/27* (2018.01)

(52) U.S. Cl.
  CPC ....... *H04W 74/0833* (2013.01); *H04W 76/15* (2018.02); *H04W 76/27* (2018.02)

(58) Field of Classification Search
  USPC .......................................................... 370/329
  See application file for complete search history.

(56) References Cited

U.S. PATENT DOCUMENTS

| | | | | |
|---|---|---|---|---|
| 2013/0182687 | A1* | 7/2013 | Ng | H04W 56/0015 370/336 |
| 2013/0188473 | A1 | 7/2013 | Dinan | |
| 2013/0250902 | A1* | 9/2013 | Xu | H04W 74/006 370/329 |
| 2013/0279390 | A1* | 10/2013 | Ohta | H04W 52/0229 370/311 |
| 2015/0029980 | A1* | 1/2015 | Bostrom | H04W 68/12 370/329 |
| 2015/0030008 | A1* | 1/2015 | Lee | H04W 56/0045 370/336 |
| 2015/0049699 | A1 | 2/2015 | Takeda et al. | |
| 2015/0117405 | A1 | 4/2015 | Takahashi | |

FOREIGN PATENT DOCUMENTS

| | | |
|---|---|---|
| JP | 2013-197876 A | 9/2013 |
| JP | 2013-223074 A | 10/2013 |
| WO | 2012/086039 A1 | 6/2012 |
| WO | 2012/149456 A1 | 11/2012 |
| WO | 2013/013539 A1 | 1/2013 |
| WO | 2013/115263 A1 | 8/2013 |

OTHER PUBLICATIONS

Written Opinion of the International Searching Authority issued in PCT/JP2014/078441 dated Jan. 20, 2015 (4 pages).
Samsung; "Discussion on adaptation enhancements and time scales for small cells"; 3GPP TSG-RAN WG1#74bis meeting, R1-134176; Guangzhou, China; Oct. 7-11, 2013 (4 pages).
Sharp; "PCell vs. SCell with Pucch for inter-eNB CA"; 3GPP TSG-RAN WG2#82, R2-132052; Fukuoka, Japan; May 20-24, 2013 (6 pages).
Huawei, HiSilicon; "Throughput results for inter-frequency deployment of small cells"; 3GPP TSG-RAN WG2 Meeting #82, R2-131782; Fukuoka, Japan; May 20-24, 2013 (5 pages).
Office Action issued in corresponding Japanese Application No. 2013-226949 dated Nov. 10, 2015, and English translation thereof (6 pages).
Office Action issued in corresponding Japanese Application No. 2013-226949 dated Mar. 31, 2016, and English translation thereof (4 pages).
Extended European Search Report dated Oct. 18, 2016 in corresponding European Patent Application No. 14857855.2 (10 pages).
Office Action issued in corresponding Japanese Patent Application No. 2016-196499, dated Jan. 9, 2018 (6 pages).
CATT, "UE power saving in dual connectivity", 3GPP TSG RAN WG2 Meeting #83bis, R2-133378, Barcelona, Spain, Aug. 18-23, 2013 (3 pages).
NTT Docomo, "Views on Small Cell On/Off Mechanisms", 3GPP TSG RAN WG1 Meeting #74, R1-133456, Barcelona, Spain, Aug. 19-23, 2013 (7 pages).
Office Action issued in corresponding European Patent Application No. 14857855.2, dated Mar. 14, 2018 (6 pages).
Office Action issued in corresponding Chinese Patent Application No. 201480059242.6, dated Oct. 17, 2018 (11 pages).
Office Action issued in corresponding European Patent Application No. 14857855.2, dated Nov. 12, 2018 (5 pages).
Office Action issued in corresponding Chinese Application No. 201480059242.6, dated Feb. 11, 2019 (12 pages).
Office Action issued in the counterpart Chinese Patent Application No. 201480059242.6, dated May 17, 2019 (9 pages).

* cited by examiner

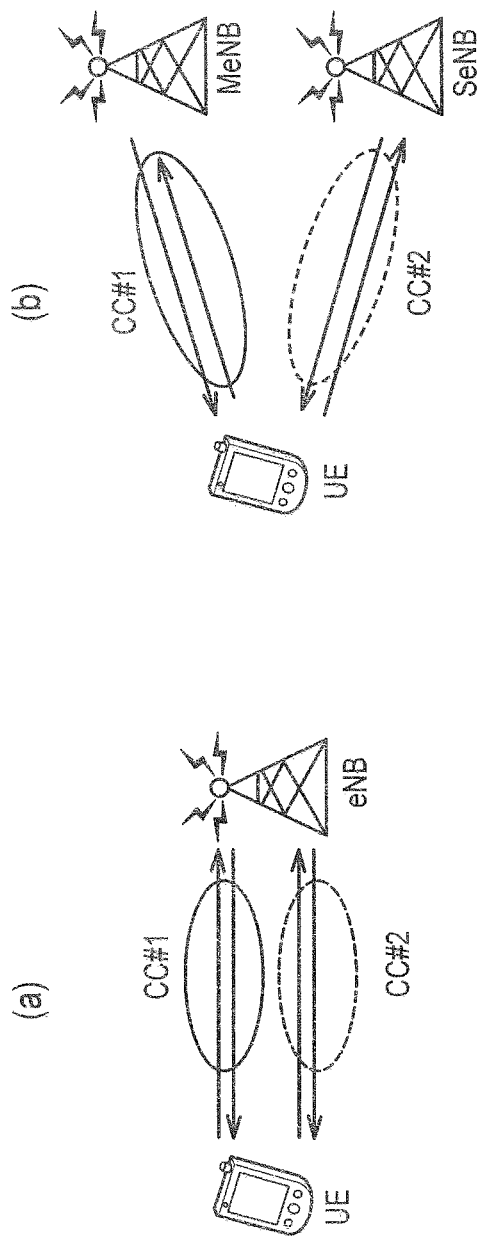

MOBILE STATION

TECHNICAL FIELD

The present invention relates to a mobile station.

BACKGROUND ART

In the LTE system, when performing CA (Carrier Aggregation), Pcell (Primary cell), which is a cell that ensures connectivity (high reliability), and Scell (Secondary cell), which is a peripheral cell, are set for a mobile station UE.

The mobile station UE is first connected to the Pcell, and can add the Scell, as and when required.

Similar to the LTE system, the Pcell is a cell that supports RLM (Radio Link Monitoring), SPS (Semi-Persistent Scheduling), and the like, and is capable of ensuring connectivity between the mobile station UE and a network.

Moreover, when changing the Pcell, it is necessary to execute a handover procedure.

The Scell is a cell that is added to the Pcell and set for the mobile station UE. The Scell can be added or removed with configuration of RRC (Radio Resource Control).

The Scell is, immediately after being set for the mobile station UE, in a deactivated (deactive) state. The state of the Scell changes to an available for communication state (available for scheduling state) only after activated in MAC (Media Access Control) layer.

Specifically, the mobile station UE activates, upon receiving "Activate command" from the network, a corresponding Scell; however, the network does not know a timing at which the mobile station UE activates the Scell. This created a problem that the network could not comprehend the appropriate scheduling timing.

To solve this problem, in Release-10/11 of the LTE system, a network (radio base station eNB) assumes, as shown in FIG. 5, upon receiving CQI (Channel Quality Indication) pertaining to the Scell that is transmitted from the mobile station UE, that the Scell has been activated, and that the scheduling can be started.

Furthermore, in the LTE system, to establish an uplink timing between the mobile station UE and the radio base station eNB, RA procedure (Random Access procedure) is started.

The RA procedure is triggered by "Initial Access procedure", "UL/DL data resuming procedure", a handover procedure, "Timing alignment on Scell procedure", and the like.

Moreover, the RA procedure is broadly classified into two types, namely "Non-contention based (contention free) RA procedure" and "Contention based RA procedure".

The "Non-contention based RA procedure" is RA procedure that is started based on an instruction from the network, and is triggered by the "DL data resuming procedure", the handover procedure, and the like.

The mobile station UE is capable of starting the "Non-contention based RA procedure" by using a "dedicated preamble" specified from the network.

On the other hand, the "Contention based RA procedure" is RA procedure that is autonomously started by the mobile station UE, and is triggered by the "Initial Access procedure", the "UL data resuming procedure", and the like.

The "Contention based RA procedure" may be started, when the "dedicated preamble" explained above is insufficient, at the network's initiative.

Furthermore, in the CA (Carrier Aggregation) stipulated till Release-10 of the LTE system, as shown in FIG. 6(*a*), high throughput could be achieved by performing a simultaneous communication using CC (Component Carrier) #1 and CC #2 under the control of the same radio base station eNB.

On the other hand, in Release-12 of the LTE system, the CA used till Release-10 of the LTE system has been expanded, and, as shown in FIG. 6(*b*), performing "Inter-eNB CA (or Inter-node UP aggregation)" is being studied (see Non-Patent Document 1). The "Inter-eNB CA" is a simultaneous communication using CC #1 and CC #2 that are under the control of different radio base stations eNB #1 and eNB #2, and can achieve high throughput.

For example, if all the CCs cannot be accommodated under a single radio base station eNB, to achieve a throughput equivalent to Release-10 of the LTE system, the "Inter-eNB CA" is required to be performed.

PRIOR ART DOCUMENT

Non-Patent Document

Non-Patent Document 1: 3GPP Contribution R2-131782

SUMMARY OF THE INVENTION

As explained above, in the "Inter-eNB CA" in the LTE system, when setting a radio base station SeNB (secondary radio base station), all Scells that are under the control of the radio base station SeNB are in a deactivated state, and "Activate command" from the radio base station SeNB does not reach a mobile station UE. It is therefore assumed that a radio base station MeNB (master radio base station) transmits "Activate command" to the mobile station UE.

However, the above method had a problem that the radio base station MeNB must monitor the active state of Scell that is under the control of different radio base stations SeNB thereby making the implementation complicated.

Moreover, in the conventional LTE system, the activation timing of the Scell depends on the implementation of the mobile station UE, and therefore at a time point at which the radio base station SeNB is set, there was a problem that the radio base station SeNB does not know from what time the scheduling for the Scell under the control thereof is possible.

The present invention has been made in view of the above circumstances. It is an object of the present invention to provide a mobile station that can perform the "Inter-eNB CA" without complicating the implementation of a radio base station MeNB.

It is another object of the present invention to provide a mobile station that can notify a radio base station SeNB that has been set of a timing at which scheduling in an Scell under the control thereof can be started.

According to a first aspect of the present embodiment, a mobile station includes a controlling unit configured to, when in a connected state in a cell that is under the control of a master radio base station, and when a secondary cell that is under the control of a secondary radio base station has been set, autonomously activates the secondary cell.

According to a second aspect of the present embodiment, a mobile station capable of performing a carrier aggregation by using a master radio base station and a secondary radio base station includes a controlling unit configured to, in the carrier aggregation, when a secondary cell that is under the control of the secondary radio base station is made active, start a random access procedure in the secondary cell.

BRIEF DESCRIPTION OF DRAWINGS

FIG. 6 is a view for explaining carrier aggregation.

DETAILED DESCRIPTION

Mobile Communication System According to First Embodiment of Present Invention

Figure 1:
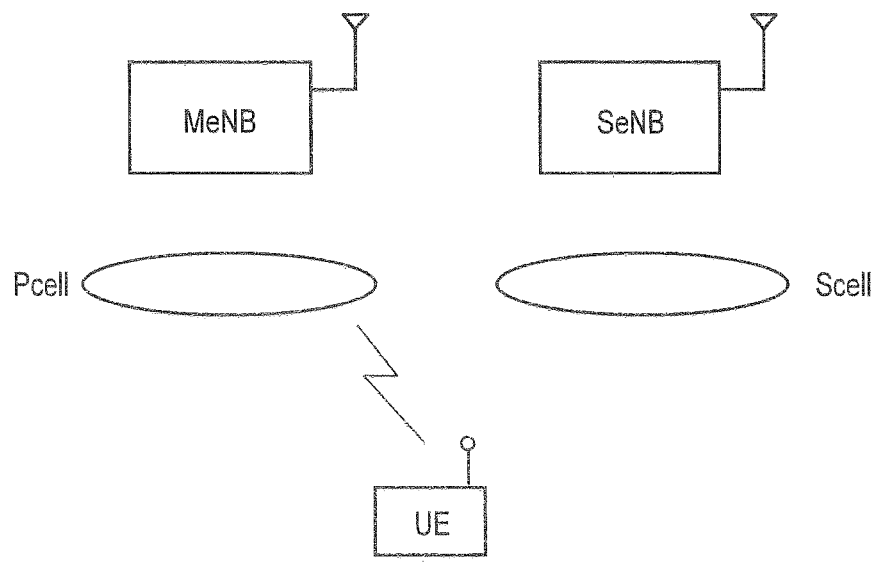
FIG. 1 is an overall structural diagram of a mobile communication system according to a first embodiment of the present invention.
Figure 2:
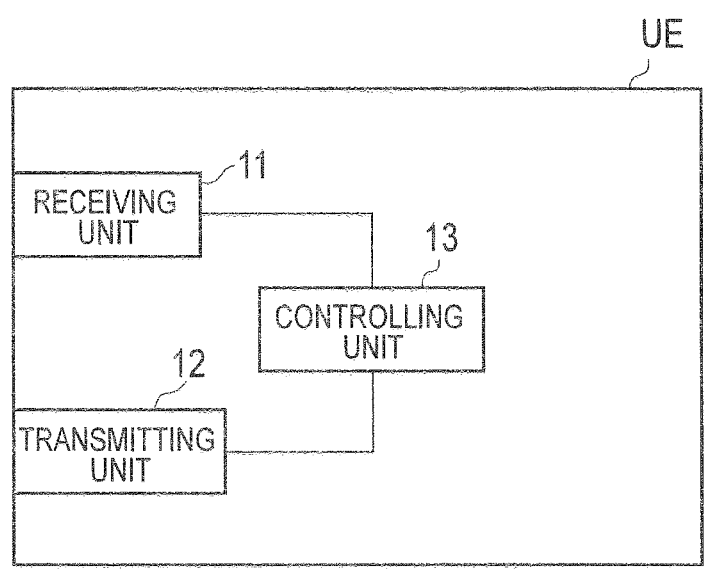
FIG. 2 is a functional block diagram of a mobile station according to the first embodiment of the present invention.
Figure 3:
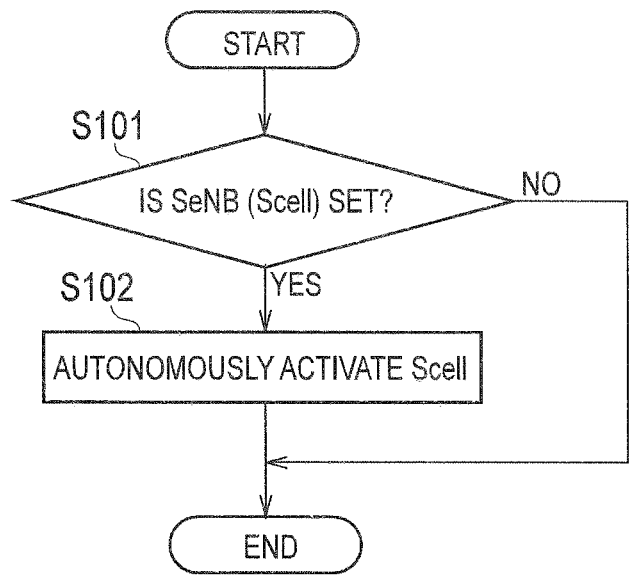
FIG. 3 is a flow chart for explaining an operation of the mobile station according to the first embodiment of the present invention.

Referring to FIGS. 1 to 3, a mobile communication system according to a first embodiment of the present invention is explained below.

The mobile communication system according to the present embodiment is a mobile communication system of the LTE system (or, LTE-Advanced system). As shown in FIG. 1, the mobile communication system includes a radio base station MeNB (a master radio base station), and a radio base station SeNB (a secondary radio base station).

In the mobile communication system according to the present embodiment, a mobile station UE is capable of performing the "Inter-eNB CA" by using the radio base station MeNB and the radio base station SeNB.

Furthermore, the mobile communication system according to the present embodiment is explained, as shown in FIG. 1, with an example of a mobile communication system in which Scell (Secondary cell) that is under the control of the radio base station SeNB is set for the mobile station UE if the mobile station UE is in "RRC_Connected state" in Pcell (Primary cell) that is under the control of the radio base station MeNB.

The "Secondary cell" can be a cell that supports PUCCH (Physical Uplink Control Channel), can be a cell that supports "Contention based RA procedure", can be a cell that has been set in the radio base station SeNB for the first time, or can be a cell in which RLM (Radio Link Monitoring) has been set.

As shown in FIG. 2, the mobile station UE according to the present embodiment includes a receiving unit 11, a transmitting unit 12, and a controlling unit 13.

The receiving unit 11 is configured to receive various signals from the radio base stations MeNB and SeNB. The transmitting unit 12 is configured to transmit various signals to the radio base stations MeNB and SeNB. The controlling unit 13 is configured to perform various controls on communication of the mobile station UE.

The controlling unit 13 is configured to autonomously activate the Scell in a situation where the Scell that is under the control of the radio base station SeNB has been set for the mobile station UE if the mobile station UE is in the "RRC_Connected state" in the Pcell that is under the control of the radio base station MeNB.

The controlling unit 13 can be configured to activate, in the above situation, only the Scell that has been set under the control of the radio base station SeNB for the first time.

Moreover, the controlling unit 13 can be configured to activate, when plural (a plurality of) Scells have been set under the control of the radio base station SeNB in the above situation, one Scell among the plural Scells that is specified from a network (the radio base station MeNB or the radio base station SeNB).

The network can be configured to specify Scell to be activated based on CellIndex or ScellIndex.

The controlling unit 13 can be configured to activate, when plural Scells have been set under the control of the radio base station SeNB, and if one Scell to be activated is not specified from the network in the above situation, all the Scells that have been set.

Alternatively, the controlling unit 13 can be configured to activate, when plural Scells have been set under the control of the radio base station SeNB in the above situation, one Scell among the plural Scells having the best downlink radio quality.

CQI, RSRP (Reference Signal Received Power), RSRQ Reference Signal Received Quality), and the like can be used as the downlink radio quality.

Alternatively, the controlling unit 13 can be configured to activate, when plural Scells have been set under the control of the radio base station SeNB in the above situation, one Scell among the plural Scells in which PRACH (Physical Random Access Channel) has been set.

Alternatively, the controlling unit 13 can be configured to activate, when plural Scells have been set under the control of the radio base station SeNB in the above situation, one Scell among the plural Scells in which PUCCH (Physical Uplink Control Channel) for Scell has been set.

Alternatively, the controlling unit 13 can be configured to activate, when plural Scells have been set under the control of the radio base station SeNB in the above situation, one Scell among the plural Scells having the highest CellIndex or ScellIndex, or the lowest CellIndex or ScellIndex.

Alternatively, the controlling unit 13 can be configured to activate, when plural Scells have been set under the control of the radio base station SeNB in the above situation, one Scell among the plural Scells having the highest value of "Scell Deactivation Timer" (or, Scell in which the timer is set to "Infinity").

Referring to FIG. 3, an example of the detailed operation of the mobile station UE according to the present embodiment is explained below.

As shown in FIG. 3, when the mobile station UE detects, at Step S101, that Scell (Secondary cell) that is under the control of the radio base station SeNB has been set for the mobile station UE if the mobile station UE is in the "RRC_Connected state" in Pcell (Primary cell) that is under the control of the radio base station MeNB, the mobile station UE autonomously activates the Scell at Step S102.

Mobile Communication System According to Second Embodiment of Present Invention

Figure 4:
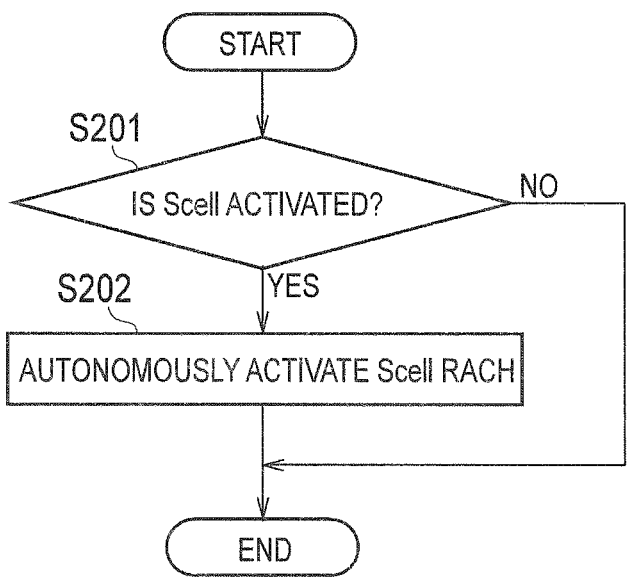
FIG. 4 is a flow chart for explaining an operation of a mobile station according to a second embodiment of the present invention.
Figure 5:
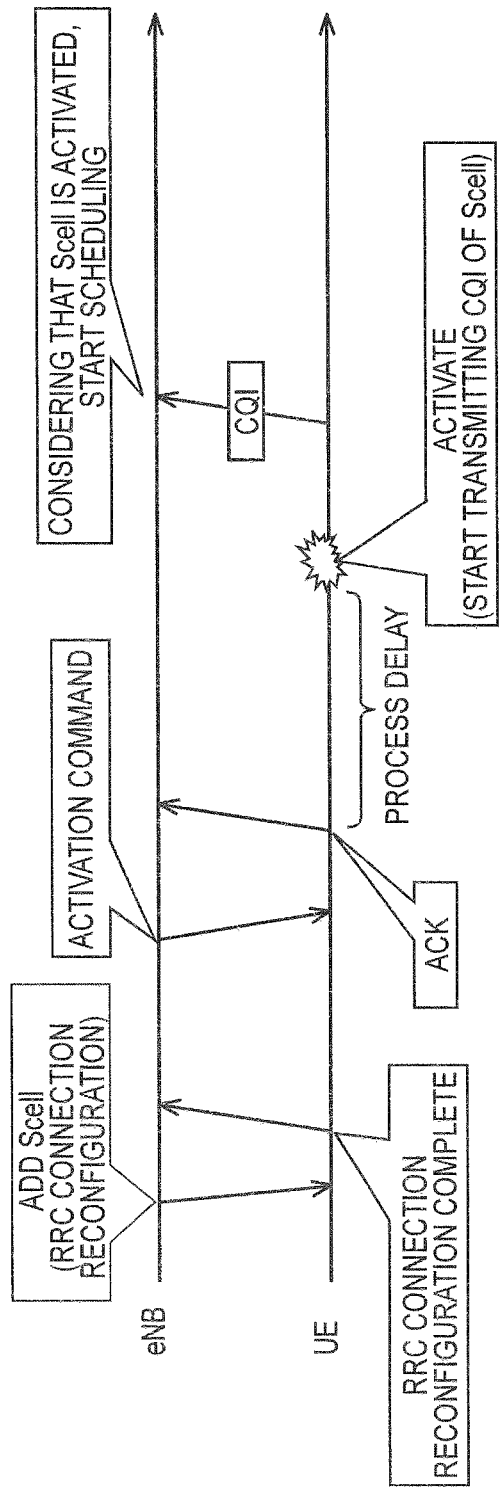
FIG. 5 is a view for explaining a start of Scell scheduling.

Referring to FIG. 4, a mobile communication system according to a second embodiment of the present invention is explained below while focusing on the points of difference with the mobile communication system according to the first embodiment.

In the mobile communication system according to the present embodiment, in the "Inter-eNB CA", the controlling unit 13 of the mobile station UE is configured to start, if Scell (Secondary cell) that is under the control of the radio base station SeNB is activated, the RA procedure in the Scell.

The controlling unit 13 is configured to start the RA procedure, even when the Scell is activated based on the instructions from the network, or even when the mobile station UE autonomously activates the Scell.

A resource (dedicated preamble) for PRACH used in the RA procedure can be configured to be specified by RRC message when the Scell is set.

However, the controlling unit 13 can be configured to start, if the resource for PRACH, as explained above, is not specified, the "Contention based RA procedure" as the RA procedure.

Moreover, in the started RA procedure, the radio base station SeNB determines, upon receiving CRC-OK of UL-SCH specified in RAR (Random Access Response) sent to the mobile station UE, that scheduling is possible in the Scell. The radio base station SeNB, then, starts reception of CSI (Channel State Indicator), or SRS (Sounding Reference Signal), and activates the "Scell Deactivation Timer".

Referring to FIG. 4, an example of the detailed operation of the mobile station UE according to the present embodiment is explained below.

As shown in FIG. 4, when the mobile station UE detects, at Step S201, that Scell (Secondary cell) under the control of the radio base station SeNB that has been set for the mobile station UE is activated, the mobile station UE autonomously starts the RA procedure in the Scell at Step S102.

The characteristics of the present embodiments explained above can be expressed as follows.

According to a first aspect of the present embodiment, a mobile station UE includes a controlling unit 13 configured to, when in "RRC_Connected state" in Pcell (cell) that is under the control of a radio base station MeNB (a master radio base station), and when Scell (Secondary cell) that is under the control of a radio base station SeNB (a secondary radio base station) has been set, autonomously activate the Scell.

According to the above aspect, the radio base station SeNB is capable of estimating, without the radio base station MeNB monitoring the active state of the Scell that is under the control of the radio base station SeNB, the activation timing of the Scell. Accordingly, the "Inter-eNB CA" can be performed without complicating the implementation of the radio base station MeNB.

In the first aspect of the present embodiment, the controlling unit 13 can be configured to activate only the Scell that has been set under the control of the radio base station SeNB for the first time.

According to the above aspect, the number of Scells that are autonomously activated by the mobile station UE can be minimized, utilization of unnecessary resources can be avoided, and the battery consumption in the mobile station UE can be reduced.

In the first aspect of the present embodiment, the controlling unit 13 can be configured to activate, when plural Scells have been set under the control of the radio base station SeNB, one Scell among the plural Scells that is specified from a network.

According to the above aspect, by activating an Scell as per the desire of a network operator, the object of the present invention of performing the "Inter-eNB CA" without complicating the implementation of the radio base station MeNB can be achieved.

In the first aspect of the present embodiment, the controlling unit 13 can be configured to activate, when plural Scells have been set under the control of the radio base station SeNB, one Scell among the plural Scells having the best downlink radio quality.

According to the above aspect, by activating the Scell having the excellent communication environment, the object of the present invention of performing the "Inter-eNB CA" without complicating the implementation of the radio base station MeNB can be achieved, and effective utilization of the communication resources can be ensured.

In the first aspect of the present embodiment, the controlling unit 13 can be configured to activate, when plural Scells have been set under the control of the radio base station SeNB, one Scell among the plural Scells in which PRACH has been set.

According to the above aspect, while activating the Scell that is important for performing the "Inter-eNB CA", the object of the present invention of performing the "Inter-eNB CA" without complicating the implementation of the radio base station MeNB can be achieved.

In the first aspect of the present embodiment, the controlling unit 13 can be configured to activate, when plural Scells have been set under the control of the radio base station SeNB, one Scell among the plural Scells in which PUCCH for Scell has been set.

According to the above aspect, while activating the Scell that is important for performing the "Inter-eNB CA", the object of the present invention of performing the "Inter-eNB CA" without complicating the implementation of the radio base station MeNB can be achieved.

In the first aspect of the present embodiment, the controlling unit 13 can be configured to activate, when plural Scells have been set under the control of the radio base station SeNB, one Scell among the plural Scells having the highest CellIndex or ScellIndex (an index number), or the lowest CellIndex or ScellIndex.

According to the above aspect, the activated Scell can be easily monitored to achieve the object of the present invention of performing the "Inter-eNB CA" without complicating the implementation of the radio base station MeNB.

In the first aspect of the present embodiment, the controlling unit 13 can be configured to activate, when plural Scells have been set under the control of the radio base station SeNB, one Scell among the plural Scells having the highest value of "Scell Deactivation Timer (deactivation timer)".

According to the above aspect, the object of the present invention of performing the "Inter-eNB CA" without complicating the implementation of the radio base station MeNB can be achieved, and effective utilization of the communication resources can be ensured.

According to a second aspect of the present embodiment, a mobile station UE capable of performing "Inter-eNB CA (carrier aggregation)" by using a radio base station MeNB and a radio base station SeNB, includes a controlling unit 13 configured to, in the "Inter-eNB CA", when Scell that is under the control of the radio base station SeNB is made active, start RA procedure (random access procedure).

According to the above aspect, the mobile station UE can notify a radio base station SeNB that has been set of a timing at which scheduling in the Scell under the control of the radio base station SeNB can be started.

In the second aspect of the present embodiment, a resource for PRACH used in the RA procedure can be configured to be specified by RRC message when the Scell is set.

According to the above aspect, by using the RRC message when the Scell is set, unnecessary transmission of messages can be avoided.

The operations of the mobile station UE, and the radio base station MeNB, SeNB can be realized by hardware, can be realized by a software module executed by a processor, or can be realized by the combination of these.

The software module can be stored in a storage medium having a desired form such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, a CD-ROM, and the like.

The storage medium is connected to a processor so that the processor can read/write information from/in the storage medium. Alternatively, the storage medium can be integrated in a processor. Alternatively, the storage medium and the processor can be arranged in ASIC. The ASIC can be arranged in the mobile station UE, and the radio base stations MeNB and SeNB. The storage medium and the processor can be arranged as a discrete component in the mobile station UE, and the radio base stations MeNB and SeNB.

The present invention has been explained in detail by using the above mentioned embodiments; however, it is obvious for a person skilled in the art that the present invention is not limited to the embodiments explained in the present description. The present invention can be implemented by way of modifications and changes without deviating from the gist and the range of the present invention specified by the claims. Accordingly, the indication of the present description aims at exemplary explanation, and has no intention to limit to the present invention.

The entire contents of Japanese Patent Application 2013-226949 (filed on Oct. 31, 2013) are incorporated in the description of the present application by reference.

INDUSTRIAL APPLICABILITY

According to the present invention, as explained above, it is possible to provide a mobile station that can implement "Inter-eNB CA" without complicating the implementation of a radio base station MeNB.

Furthermore, according to the present invention, it is possible to provide a mobile station that can notify a radio base station SeNB that has been set of a timing at which scheduling in Scell under the control thereof can be started.

UE Mobile station
MeNB, SeNB Radio base station
11 Receiving unit
12 Transmitting unit
13 Controlling unit

The invention claimed is:

1. A mobile station comprising:
a transceiver that communicates with a master radio base station that controls a primary cell (Pcell) and a secondary radio base station that controls a plurality of secondary cells (Scells); and
a processor that, when the Pcell is in a connected state, and when the plurality of Scells have been set, activates a predetermined Scell controlled by the secondary radio base station, the predetermined Scell being in a deactivated state,
wherein the predetermined Scell controlled by the secondary radio base station is one of the plurality of secondary cells,
wherein the processor sets "Scell Deactivation Timer" of the predetermined Scell to "Infinity" prior to activating the predetermined Scell, and
wherein the transceiver performs carrier aggregation where a component carrier in the Pcell and a component carrier in the activated predetermined Scell are aggregated.

* * * * *